July 2, 1963 E. LOOSE ETAL 3,095,793
PHOTOGRAPHIC SHUTTER
Filed July 29, 1960 3 Sheets-Sheet 1

Inventors
ERHARD LOOSE
KARL KROMER
WERNER HAHN
By Irwin S. Thompson
Attorney

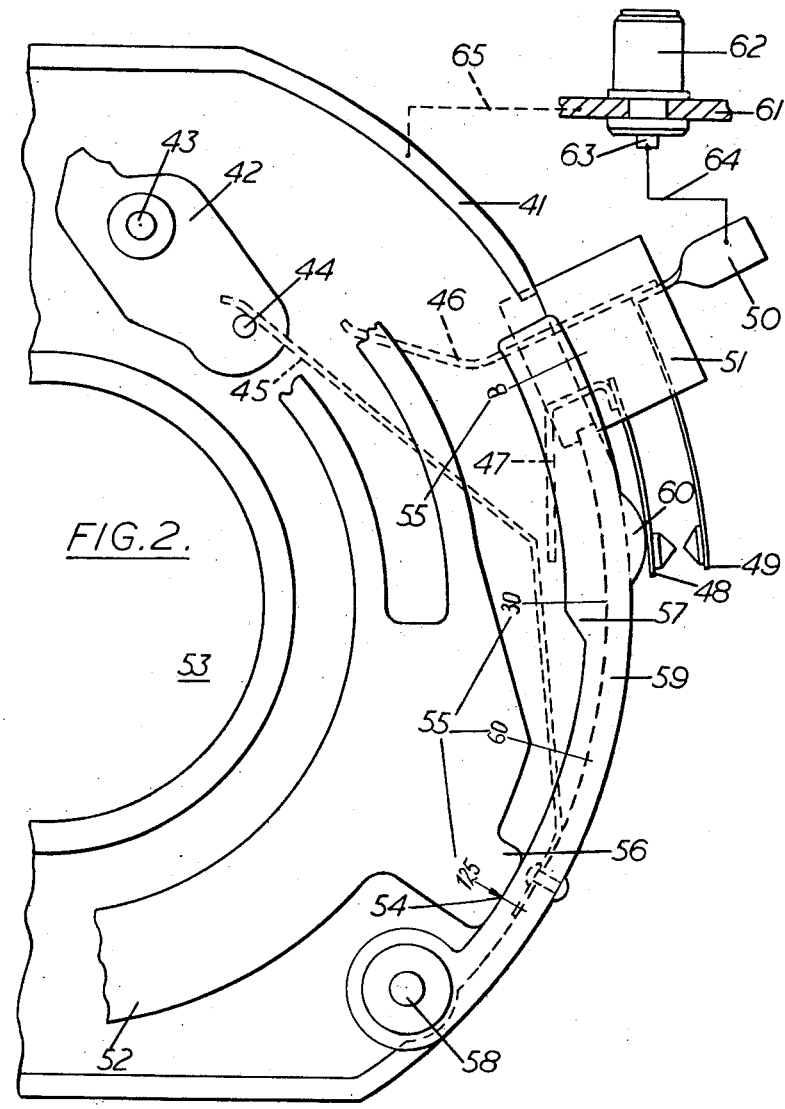

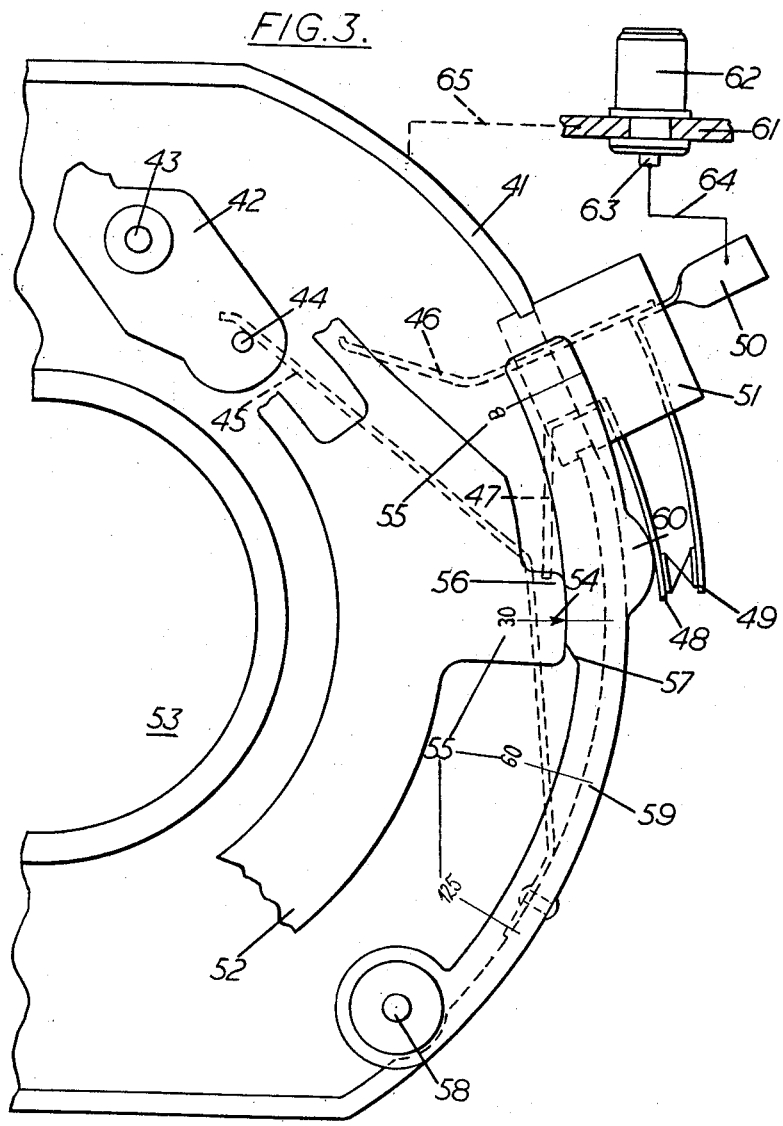

3,095,793
PHOTOGRAPHIC SHUTTER

Erhard Loose, Dresden, Karl Krömer, Radebeul, and Werner Hahn, Dresden, Germany, assignors to VEB Kamera- und Kinowerke Dresden, Dresden, Germany
Filed July 29, 1960, Ser. No. 46,289
5 Claims. (Cl. 95—11.5)

The present invention relates to a photographic shutter having a plurality of flash light contacts which serve for the synchronous lighting of various types of flash lamps.

In the known shutters of this nature there were provided either separate connection nipples on the camera or shutter housing for each flash light contact, or manually operable switches for the selection of the pre-lighting time necessary for example. In both cases additional manual operations either in the form of transference of flash light connections or actuation of the switch were necessary. Apart from this, these special switches more especially constituted operating elements which had to be observed additionally, which was contrary to a facilitation of operation which was to be sought.

The object of the invention is a simplification of the requisite adjustments in flash light picture-taking by the avoidance of additional manual operations.

In accordance with the invention this is achieved due to the fact that a switch controlled by the exposure time setting member of a shutter blocks or releases the flash light contacts for the closing of the lighting current circuit. The flash light contacts preferably are connected through this switch alternately to a common connection nipple, while the switch is arranged in the path of a dog connected with the time setting member of the shutter. In this manner the object is achieved that with variation of the exposure time the flash light contact suitable for the flash light ignition is automatically connected to the common connection nipple. This is advantageous above all in the case of those shutters wherein different exposure times are achieved by different tensioning of drive springs and accordingly the contact closure occurring in dependence on the speed of running off of the shutter mechanism causes different pre-lighting times. For the purpose of indication of the flash light contact connected to the common connection nipple symbols of the set contact closure are preferably provided beside the values of an exposure time scale.

In accordance with a special feature of the invention a switch is provided which in dependence upon the position of an exposure time setting member successively switches off the flash light contacts serving for the pre-lighting in the sequence in which they are actuated in the running-off of the shutter mechanism. The arrangement of the switch is preferably made such that a dog of the exposure time setting member, through a resiliently mounted lever, actuates the switch.

The details of the invention may be seen from the examples of embodiment described and illustrated hereinafter, the arrangement in accordance with the invention being installed in a between-the-lens shutter.

FIGURES 2 and 3 show an arrangement with switches arranged in series.

Figure 1:
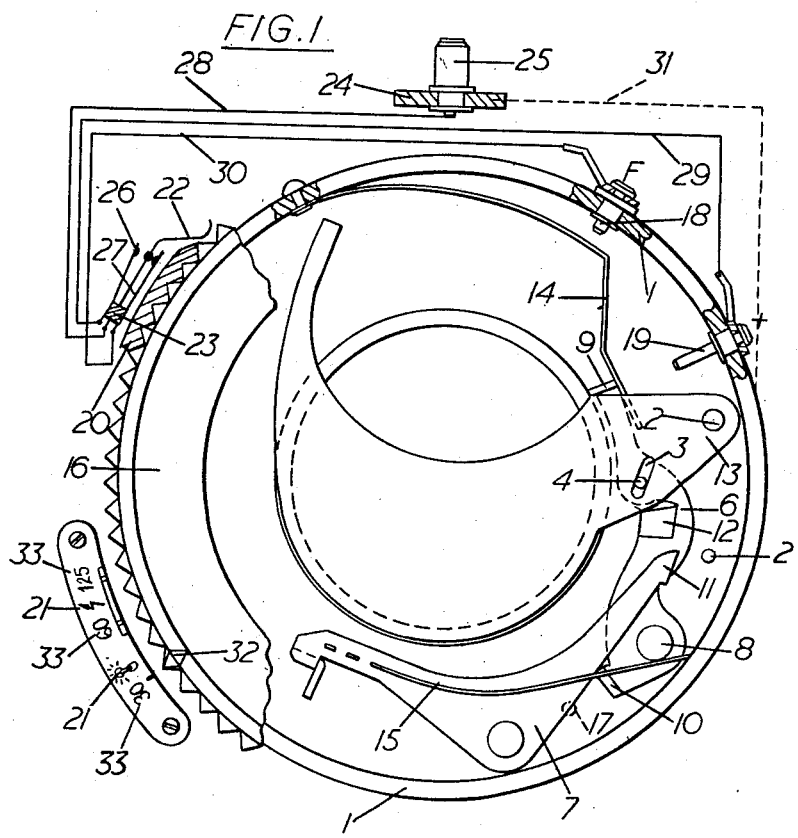
FIGURE 1 shows an arrangement with switches arranged in parallel.

In the shutter housing 1 (see FIGURE 1) the blades 13 are rotatably mounted on the spindles 2, only one of these blades being illustrated for the sake of simplicity. Through the slot 3 of the blade 13 there extends the pin 4 of the blade lever 6, which cooperates through an oblique surface 12 with the arm 11 of the striker lever 7. The striker lever 7 is rotated by the drive spring 15, which is initially tensioned by a pin 17 situated on the time-setting ring 16, on setting of shorter exposure times.

Against the lug 9 of the blade lever 6 rotatable about the spindle 8 there presses the contact spring 14 serving at the same time as closure spring. In the path of this contact spring 14 there lie the contact pins 18 and 19, the distance of which from the contact spring 14 is dimensioned so that in the running off of the shutter mechanism they are contacted by the contact spring 14 at different moments of time.

On the time setting ring 16 there is provided a dog 20 in the path of which there lies the tongue 22 of the switch 23. This tongue 22 is connected through the lead 28 with one pole of the connection nipple 25 mounted on the camera housing 24, while the other two tongues 26 and 27 are connected through the leads 29 and 30 with the contact pins 19 and 18. The current circuit is closed through the earth lead 31.

Opposite the mark 32 of the time-setting ring 16 there is provided a scale with values 33 for exposure times. Besides these values there are situated symbols 21 for the characterisation of the flash light type suitable for an exposure.

The manner of operation of the device is as follows:
If the time setting ring 16 is set with its mark 32 to the value "1/30 sec.," the two tongues 22 and 27 of the switch 23 come into contact with one another. Consequently, the contact pin 18 designated with "F" is connected with the connection nipple 25, while the contact pin 19 designated by "X" is disconnected from the connection nipple 25.

On setting of the time-setting member 16 to a shorter value of the time scale, for example to the value "1/60 sec.," the dog 20 of the time setting ring 16 grasps the tongue 22, lifts it away from the tongue 27 and presses it against the tongue 26. In this manner the contact pin 18 designated by "F" is disconnected from the connection nipple 25, while the contact pin 19 designated by "X" is connected with the connection nipple 25.

In this manner thus merely as a result of setting of an exposure time certain flash lamp types which it is possible to use are indicated and also a switching over to the contact suitable for the lighting is automatically achieved.

In the shutter housing 41 (see FIGURES 2 and 3) the blade lever 42 driving the blades (not shown) in known manner is mounted for rotation about the spindle 43. Against the pin 44 of the blade lever 42 there presses the contact spring 45 serving at the same time as closure spring. At a different distance from the contact spring 45 there lies the counter-contacts 46 and 47. The counter contact 47 arranged at a lesser distance from the contact spring 45 is connected with the contact tongue 48, which is arranged opposite the contact tongue 49. The contact tongue 49 and the counter-contact 46 are connected with a contact tag 50 which extends out of the insulating socket 51 secured on the shutter housing 41.

In the shutter housing 41 the time-setting ring 52 is further rotatably mounted concentrically with the light-passage aperture 53. The time-setting ring 52 is adjustable by means of a mark 54 opposite a plurality of exposure time values 55. In the path of its nose 56 there lies a projection 57 of the lever 59 rotatable about the spindle 58. The lever 59 possesses the dog 60, against which the resiliently constructed contact tongue 48 places itself, which tongue seeks to detach itself from the contact tongue 49.

On the only partially illustrated camera housing 61 there is secured the connection nipple 62, the central pin 63 of which is connected through a lead 64 to the contact tag 50. The camera housing 61 is connected with the shutter housing 41 through the earth lead 65.

The manner of operation of the device is as follows:

In the case of the setting of the exposure time setting ring 52 to short exposure times such for example as "1/125 sec." (see FIGURE 2) where as a result of the high speed of running-off of the shutter mechanism in any case no flash lamp types with lighting delay can be lit synchronously, the nose 56 of the exposure time setting member 52 does not come into contact with the projection 57 of the lever 59. Consequently, the resilient contact tongue 48 can depart from the contact tongue 49. Despite the contact occurring during the running-off of the shutter between the contact spring 45 and the counter-contact 47 thus no closing of the lighting surrent circuit takes place. Rather this only takes place when at the moment of full opening of the shutter the contact spring 45 comes into contact with the counter-contact 46 arranged at a greater distance from the contact spring 45.

If an exposure time for example "1/30 sec." is set (see FIGURE 3), where as a result of the lower running-off speed of the shutter mechanism an adequate pre-lighting is produced, the nose 56 of the exposure time setting ring 52, through the projection 57 and the lever 59, presses the contact tongue 48 against the contact tongue 49. In this manner the electrical connection between the counter-contact 47 and the contact tag 50 is produced, so that on running-off of the shutter mechanism the contact between the contact spring 45 and the counter-contact 47 closes the lighting current circuit.

The contact of the counter-contact 46 also occurring, through the contact spring 45, remains without influence on the lighting which has already taken place.

We claim:

1. In a photographic camera having a housing, a shutter device mounted in the housing and an exposure time setting member rotatably mounted in the housing, the provision of a plurality of flash-light contacts for lighting flash lamps having different delay characteristics, switch means mounted in the housing, a plurality of electrical circuits connected to said contacts respectively and to said switch means, said switch means being moved by the exposure time setting member to select one of said circuits in accordance with the position of the exposure time setting member corresponding to the preset exposure time, and means, driven by said shutter device, to engage said contacts in turn to complete said selected circuit on operation of the camera, the other circuit being ineffective.

2. In a photographic camera having a housing, a shutter device mounted in the housing and an exposure time setting member rotatably mounted in the housing, the provision of a plurality of flash light contacts for lighting flash lamps having different delay characteristics, switch means mounted in the housing, a plurality of electrical circuits connected to said contacts respectively and to said switch means, a projection formed on said exposure time setting member, said switch means being moved by said projecting on rotation of the exposure time setting member to select one of said circuits in accordance with the position of the exposure time setting member corresponding to the preset exposure time, and means, driven by said shutter device, to engage said contacts in turn to complete said selected circuit on operation of the camera, the other circuit being ineffective.

3. In a photographic camera having a housing, a shutter device mounted in the housing and an exposure time setting member rotatably mounted in the housing, the provision of a plurality of flash-light contacts for lighting flash lamps having different delay characteristics, switch means mounted in the housing, a plurality of electrical circuits connected to said contacts respectively and to said switch means, an exposure time scale on the housing, an exposure time setting mark on the exposure time setting member, symbols provided on said housing for the characterization of the flash lamp types, said switch means being moved by the exposure time setting member to select one of said circuits in accordance with the position of the mark on the exposure time setting member corresponding to the preset exposure time on the scale, and means, driven by said shutter device, to engage said contacts in turn to complete said selected circuit on operation of the camera, the other circuit being ineffective.

4. In a photographic camera having a housing, a shutter device mounted in the housing and an exposure time setting member rotatably mounted in the housing, the provision of a plurality of flash-light contacts for lighting flash lamps having different delay characteristics, switch means mounted in the housing, flash-lamp connecting means mounted on the housing and electrically connected to said switch means, a plurality of electrical circuits connected to said contacts respectively and to said switch means, said switch means being moved by the exposure time setting member to connect one of said circuits to the flash lamp connecting means in accordance with the position of the exposure time setting member corresponding to the preset exposure time, and means, driven by said shutter device, to engage said contacts in turn to complete said selected circuit on operation of the camera, the other circuit being ineffective.

5. In a photographic camera having a housing, a shutter device mounted in the housing and an exposure time setting member rotatably mounted in the housing, the provision of a plurality of flash-light contacts for lighting flash lamps having different delay characteristics, switch means mounted in the housing, a plurality of electrical circuits connected to said contacts respectively and to said switch means, a projection formed on said exposure time setting member, a lever resiliently mounted on said housing, said switch means being moved by said projection through said resiliently mounted lever on rotation of the exposure time setting member to select one of said circuits in accordance with the position of the exposure time setting member corresponding to the preset exposure time, and means, driven by said shutter device, to engage said contacts in turn to complete said selected circuit on operation of the camera, the other circuit being ineffective.

References Cited in the file of this patent

UNITED STATES PATENTS

| | | |
|---|---|---|
| 2,655,085 | Gebele | Oct. 13, 1953 |
| 2,663,233 | Rentschler | Dec. 22, 1953 |
| 2,933,025 | Meyer | Apr. 19, 1960 |